June 7, 1949.   M. G. HINNEKENS   2,472,375
TENTER CLIP
Filed Dec. 18, 1946

INVENTOR,
Maurice G. Hinnekens,
BY
John W. Steward
ATTORNEY

Patented June 7, 1949

2,472,375

UNITED STATES PATENT OFFICE 2,472,375

TENTER CLIP

Maurice G. Hinnekens, Paterson, N. J.

Application December 18, 1946, Serial No. 716,977

8 Claims. (Cl. 26—61)

This invention relates to tenter-clips, being the cloth-gripping units or links of either of two endless chains of a tentering machine. Such a clip usually comprises, with an elongated body or body portion pivoted on vertical axes to adjoining clips, means carried by said body for directly gripping the cloth. Of course, in operation each chain coacts with the other, while travelling, to stretch the cloth transversely, wherefore each chain between supporting sprocket-wheels therefor must be suitably supported not only against downward displacement or sagging but against displacement toward the other chain in order to perform the cloth-stretching function of the chains. For this purpose each chain and its sprocket-wheels and other parts are supported by rails or beds, susceptible of certain adjustments, as toward and from each other, which provide grooves in which the bodies of the clips travel; the bottoms of the grooves support the clips against sagging and the relatively inner side of each groove which adjoins the other rail or bed supports the clips of the corresponding chain against lateral displacement incident to the stretching of the cloth. The clip bodies undergo very considerable wear as an incident of the lateral displacement or cloth-stretching effort—so much so that in time the wear reaches so close to the pivot connecting some clip and its neighbor that the clip as a whole has to be discarded. The clip bodies also undergo appreciable wear at their under faces by the bottoms of the grooves.

According to this invention the mentioned wear is assumed, not by the clip, but by an attachment which when unduly worn can be replaced at much less expense than a worn-out clip.

Figure 2:
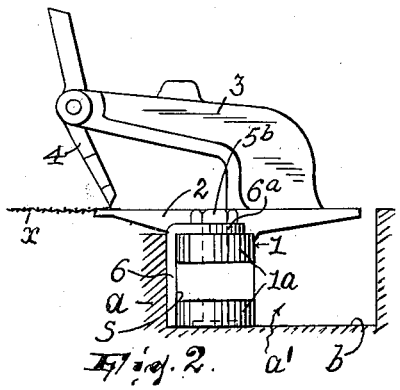
Fig. 2 shows the chain portion as seen from the right in Fig. 1, with the groove-forming part of the corresponding bed in section.
Figure 3:
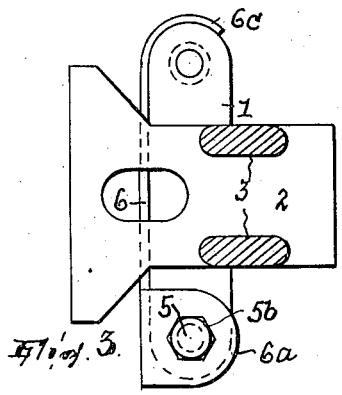
Fig. 3 is a horizontal section of the assembled clip and attachment of Fig. 1.
Figure 4:
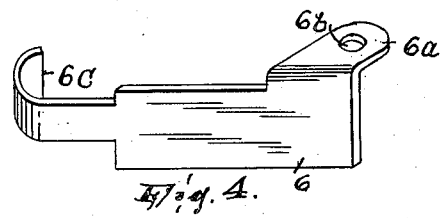
Fig. 4 is a perspective view of said attachment.

A conventional tenter clip is shown in the drawing in connected relation with a portion of a similar clip and comprises, an elongated body part I formed with a table 2 fashioned with left and right-hand projections with respect to the body part as viewed in Figs. 2 and 3, the left-hand projection constituting the fixed jaw of the clip. Upstanding from the right-hand projection of the table 2 and over-reaching the fixed jaw is a pair of arms 3 in which is pivoted the movable jaw 4 of the clip, the jaw 4 of the clip coacting with the fixed jaw to grip the cloth $x$ in the usual manner.

Figure 1:
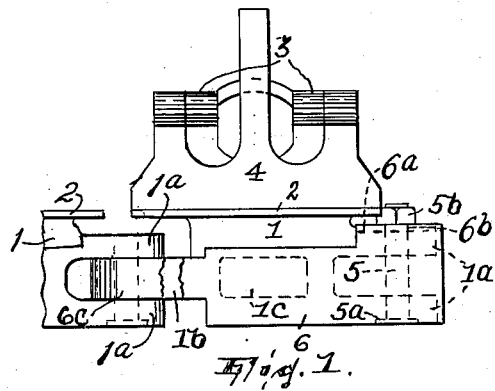
Fig. 1 is a view of a portion of a tenter clip chain embodying my invention and as seen from one side of the chain.

The clip constitutes one of a number of similar clips between which it is interposed to provide a complete chain of clips and wherein one end of each of the body parts I is forked or bifurcated to provide a pair of spaced arms or projections $1a$ while the opposite end is formed with a single tongue or projection $1b$ adapted to extend between the projections $1a$ of the adjacent body part I, the ends of the projections being semi-circular in plan to provide rounded or curved ends. Studs 5 extend through the projections $1a$ and $1b$ for pivotly connecting the body parts I together and each stud 5 is entered upwardly and has a head $5a$ at its lower end counter-sunk in the lowermost projection $1a$, and has a nut $5b$ threaded on its upper end, the dotted outline at $1c$ in Fig. 1 merely representing an opening in the casting from which the clip is fashioned.

In tentering machines, a pair of spaced endless chains of the clips are employed whose adjoining or proximous stretches or runs each travelling in a groove $a'$ of the respective bed or rail $a$ for the chains. During travel in the groove $a'$, each clip operates over the upper face $b$ of the bottom wall and is urged by the cloth against the face $s$ of the side wall defining the groove proximous the other chain, the face $s$ being on the left as viewed in Fig. 2. Inasmuch as the body parts I of the clips bear directly against the aforementioned faces of the grooves $a'$, the contacting faces of the body parts are subjected to considerable wear. In order to protect the body parts from wear, I provide a wear assuming attachment capable of being secured to each of the clips.

As illustrated in Figs. 1 to 4 inclusive of the drawing, the attachment for assuming the wear comprises an oblong plate 6 of suitable material which is provided, near one end and projecting from one long side thereof, an ear or extension $6a$, the latter being deflected or bent perpendicular to the plate and formed with an aperture $6b$. The other end of the plate is incurvated to provide an arcuate or hook-shaped finger or extension $6c$ which is of a width not exceeding the thickness of the projection $1b$ of the clip, it being understood that the projection $6a$ is curved in the same direction and to the same degree as the extension 6a in order that it may conform to the contour of the curved end of the projection 1b. The attachment is disposed between the face s of the groove a' and the confronting face of the clip and has its extension 6c in hooked relation with the projection 1b, the ear or extension 6a being disposed over the topmost projection 1a and secured thereagainst by the nut 5b of the stud 5, the latter extending through the aperture 6b. Obviously when the attachment is secured to the clip in the foregoing described manner, they constitute a unit.

Figure 5:
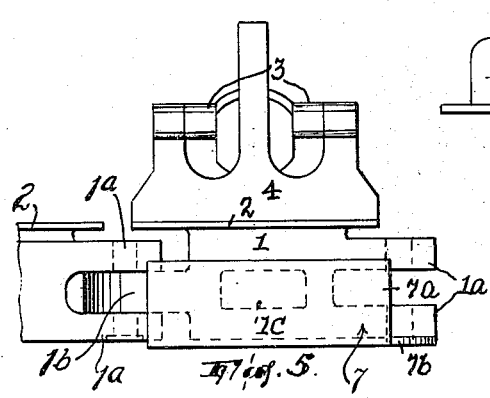
Fig. 5 is a view like Fig. 1 but showing a modification of said attachment.
Figure 6:
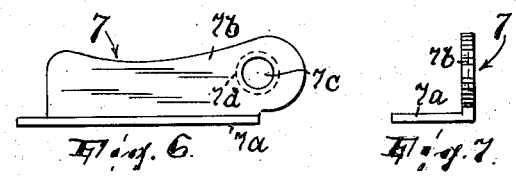
Figs. 6 and 7 are plan and end views of the attachment appearing in Fig. 5.
Figure 7:
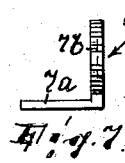

In the form of the attachment shown in Figs. 5 to 7, the plate 7 is lengthwise bent to provide two portions 7a and 7b disposed in planes perpendicular to each other. The portion 7a is disposed over the face of the clip which confronts the face s of the groove a' of the bed or rail a while the portion 7b is disposed under the body part 1 in engagement with the under face of the body part and the upper face b of the groove a'. When the portions 7a and 7b thus embrace the body part, the plate 7 assumes the wear which the clip would otherwise undergo by contact with the faces b and s. In order to secure the attachment to the clip, the portion 7b is formed with an aperture 7c through which extends the stud 5. The head 5a of the stud is counter-sunk within the portion 7b by reason of the latter being rabbeted, as at 7d, around the aperture. While not disclosed in Figs. 5 to 7 of the drawing, the heretofore disclosed stud 5 and nut 5b are employed to secure the attachment to the clip.

In the appended claims I term the face of the clip, specifically, the face of its body part 1, which is disposed in confronting relation with the face s of the side wall of the groove a' and proximous to the other chain of the machine, as its thrust-assuming face, having in view of the circumstance that it assumes whatever thrust the clip undergoes when it grips the cloth and is by the tension of the cloth urged towards the same and the other chain of clips. Furthermore, the term "adpressed" as used in the claims, is to be broadly construed and to define a relationship wherein one component or element is pressed closely to or against or lies flat against another component or element.

Having thus fully described my invention, what I claim is:

1. A tenter clip having spaced parallel pivoting studs whereby to connect it pivotally to two other tenter clips between which it is disposed in the forming of a tenter-clip chain for a tentering machine, said clip having a thrust-assuming face lateral of and facing away from that plane which is coincident with both axes of the studs, in combination with an attachment removably secured to said clip in sheathing relation to said face and having a deflected portion penetrated by and snugly fitting one stud and another portion hooked around and thereby anchored to the portion of the clip which surrounds the axis of the other stud.

2. An attachment for a tenter clip of a type adapted to constitute a component of a tenter clip chain and with said clip having a body part provided, between its ends, with a thrust assuming side face engaging a thrust receiving lateral face defining a groove in a support in which the chain travels and, at its ends, with projections for pivotal connection with projections of adjacent similar parts by studs extending through said projections to form said chain; comprising, plate-like means adapted to be disposed in adpressed relation with said side face for receiving wear occasioned by travel engagement with said lateral face, said means being provided, adjacent one end, with securing means adapted to be secured to one of said projections by the stud thereof, and means adjacent the other end of said plate and coacting with said securing means for maintaining said plate in connected and adpressed relation with said side face.

3. An attachment for a tenter clip of a type adapted to constitute a component of a tenter clip chain and with said clip having a body part provided, between its ends, with a thrust assuming side face engaging a thrust receiving lateral face defining a groove in a support in which the chain travels and, at its ends, with projections for pivotal connection with projections of adjacent similar parts by studs extending through said projections to form said chain; comprising, a plate adapted to be disposed in adpressed relation with said side face for receiving wear occasioned by travel engagement with said lateral face, said plate being provided, adjacent one end, with an angularly related portion extending from one side of said plate and adapted to be secured to one of said projections by the stud thereof, and means adjacent the other end of said plate and coacting with said portion for maintaining said plate in connected and adpressed relation with said side face.

4. An attachment for a tenter clip of a type adapted to constitute a component of a tenter clip chain and with said clip having a body part provided, between its ends, with a thrust assuming side face engaging a thrust receiving lateral face defining a groove in a support in which the chain travels and, at its ends, with projections for pivotal connection with projections of adjacent similar parts by studs extending through said projections to form said chain; comprising, a plate adapted to be disposed in adpressed relation with said side face for receiving wear occasioned by travel engagement with said lateral face, said plate being provided, adjacent one end, with an ear formed with an aperture, said ear extending from one side of said plate and adapted to be secured in abutting relation with one of said projections by the stud thereof extending through said aperture, and means adjacent the other end of said plate and coacting with said ear for maintaining said plate in connected and adpressed relation with said side face.

5. An attachment for a tenter clip of a type adapted to constitute a component of a tenter clip chain and with said clip having a body part provided, between its ends, with a thrust assuming side face for engaging a thrust receiving lateral face defining a groove in which the chain travels and, at its ends, with projections for pivotal connection with projections of adjacent similar parts by studs extending through said projections to form said chain; comprising, a plate adapted to be disposed in adpressed relation with said side face for receiving wear occasioned by travel engagement with said lateral face, said plate being formed at one end with an angularly related ear having an aperture, said ear extending from one side of said plate and adapted to be secured to one of said projections by the stud thereof extending through said aperture, said plate being formed at the other end with an arcuate extension for embracing another of said projections and coacting with said ear for maintaining said plate in connected and adpressed relation with said side face.

6. An attachment for a tenter clip of a type adapted to constitute a component of a tenter clip chain and with said clip having a body part provided, between its ends, with a pair of faces including a thrust assuming side face engaging a thrust receiving lateral face defining a groove in a support in which the chain travels and, at its ends, with projections for pivotal connection with projections of adjacent similar parts to form said chain; comprising a plate having a side portion adapted to be secured in adpressed relation with said side face for receiving wear occasioned by travel engagement with said lateral face, said plate being provided, at one side, with a portion angularly related to said first mentioned portion and adapted to be disposed in adpressed relation with a face other than said side face of said pair and to be secured thereto for maintaining said plate in connected and adpressed relation with said pair of faces.

7. An attachment for a tenter clip of a type adapted to constitute a component of a tenter clip chain and with said clip having a body part provided, between its ends, with side and under faces for engaging the lateral and bottom faces respectively defining a groove in a support in which the chain travels and, at its ends, with projections for pivotal connection with projections of adjacent similar parts by studs extending through said projections to form said chain; comprising an elongated plate formed between its ends with angularly related side and bottom portions adapted to be disposed in adpressed relation with said side and under faces respectively, said bottom portion adapted to extend between said bottom face and one of said projections and to be secured to the latter by the stud thereof whereby to maintain said plate in connected and adpressed relation with said side and under faces for receiving wear occasioned by travel engagement with said lateral and bottom faces.

8. In combination, a tenter clip of a type adapted to constitute a component of a tenter clip chain and with said clip having a body part provided, between its ends, with a thrust assuming side face for engaging a thrust receiving lateral face defining a groove in a support in which the chain travels and, at its ends, with projections for pivotal connection with projections of adjacent similar parts by studs extending through said projections to form said chain; and replaceable plate-like means disposed in adpressed relation with said side face for receiving wear occasioned by travel engagement with said lateral face, said means being provided, adjacent one end, with securing means secured to one of said projections by the stud thereof, and means adjacent the other end of said plate and coacting with said securing means for maintaining said plate in connected and adpressed relation with said side face.

MAURICE G. HINNEKENS.

REFERENCES CITED

The following references are of record in the file of this patent:

UNITED STATES PATENTS

| Number | Name | Date |
| --- | --- | --- |
| 1,307,606 | Wiegand | June 24, 1919 |
| 1,634,645 | Bens | July 5, 1927 |
| 1,832,420 | Peterson | Nov. 17, 1931 |
| 1,856,795 | Stelling | May 3, 1932 |
| 2,157,644 | Williams | May 9, 1939 |
| 2,267,304 | Kottlowski | Dec. 23, 1941 |
| 2,285,820 | MacKnight | June 9, 1942 |
| 2,410,907 | Stowell | Nov. 12, 1946 |

FOREIGN PATENTS

| Number | Country | Date |
| --- | --- | --- |
| 18,722 | Great Britain | 1914 |
| 323,390 | Great Britain | Jan. 2, 1930 |